United States Patent [19]

Byer et al.

[11] 4,310,808
[45] Jan. 12, 1982

[54] HIGH POWER LASER EMPLOYING AN UNSTABLE RESONATOR

[75] Inventors: Robert L. Byer, Stanford; Richard L. Herbst, Menlo Park, both of Calif.

[73] Assignee: Quanta-Ray, Inc., Mountain View, Calif.

[21] Appl. No.: 77,308

[22] Filed: Sep. 20, 1979

Related U.S. Application Data

[63] Continuation of Ser. No. 752,110, Dec. 20, 1976, abandoned.

[51] Int. Cl.³ .............................................. H01S 3/081
[52] U.S. Cl. .............................................. 331/94.5 C
[58] Field of Search .................................. 331/94.5 C

[56] References Cited

U.S. PATENT DOCUMENTS

| | | | |
|---|---|---|---|
| 3,422,370 | 1/1969 | Collin, Jr. | 331/94.5 M |
| 3,437,953 | 4/1969 | Buchman | 331/94.5 Q |
| 3,815,044 | 6/1974 | Hook et al. | 331/94.5 C |
| 3,919,664 | 11/1975 | McAllister | 331/94.5 C |

Primary Examiner—William L. Sikes
Attorney, Agent, or Firm—Harry E. Aine; Harvey G. Lowhurst

[57] ABSTRACT

The high power laser includes a high gain medium (>80%) such as a lightly doped Nd:YAG rod contained within an unstable optical resonator of the type wherein power flows outward from the optical axis of the resonator. The output beam is coupled out of the resonator by means of a coupling device having a high coupling factor (>55% of the circulating power inside the optical resonator) and in a preferred embodiment the coupling factor is as high as 80-90%. The optical resonator is preferably a confocal resonator employing one concave mirror and one convex mirror. The convex mirror forms the output coupling device for providing a high degree of diffraction output coupling around the periphery of the output mirror. The output beam is collimated in the region of the output mirror. The curvatures of the two mirrors forming the optical resonator are dimensioned to take into account the positive focusing lens effect of the high gain medium produced by a transverse thermal gradient in the high gain medium encountered in use when pumped by flash lamps. The laser is Q-switched by means of a linear polarizer and a pulsed KD*P quarter wave plate. The output beam has 25 megawatts of peak power with a pulse width of 10 nanoseconds and a pulse repetition rate of 10 pulses per second. The output beam has a power density of 75 megawatts per square centimeter.

13 Claims, 4 Drawing Figures

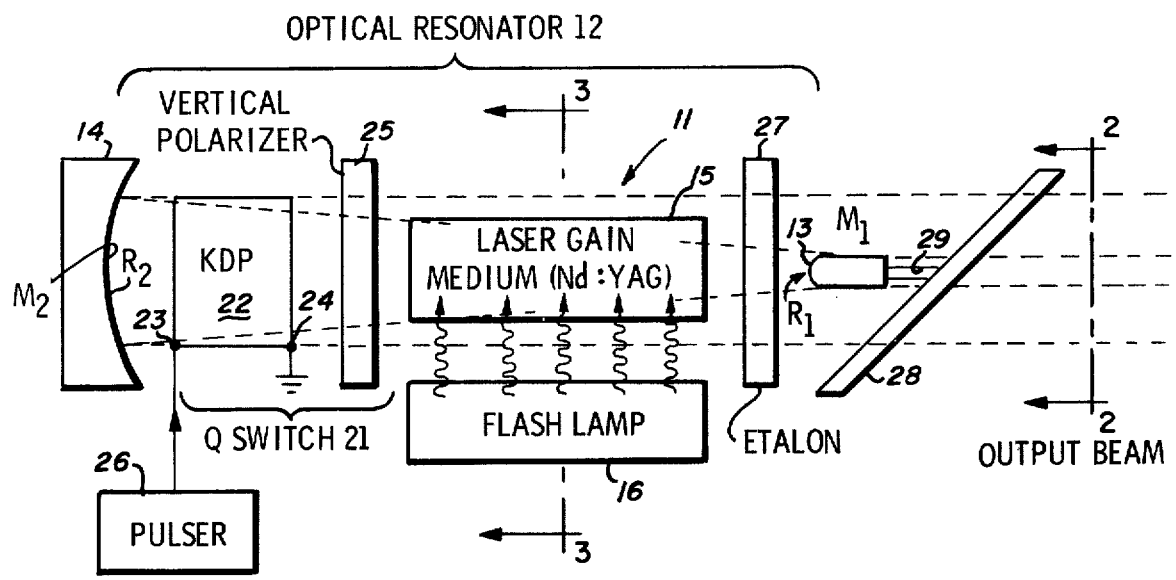
Fig_1
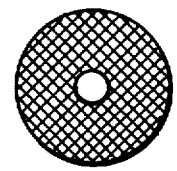
Fig_2
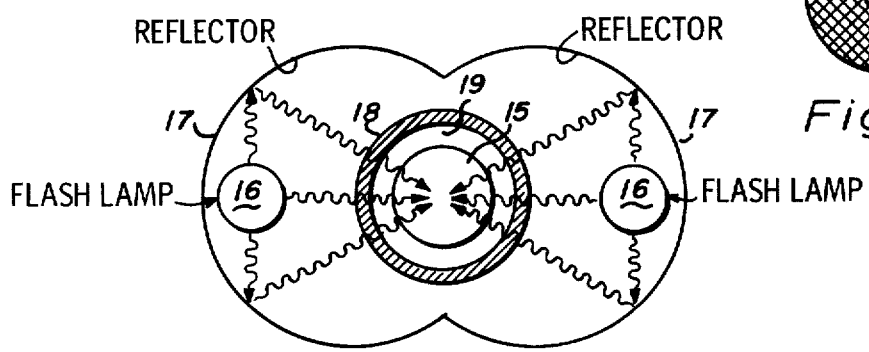
Fig_3
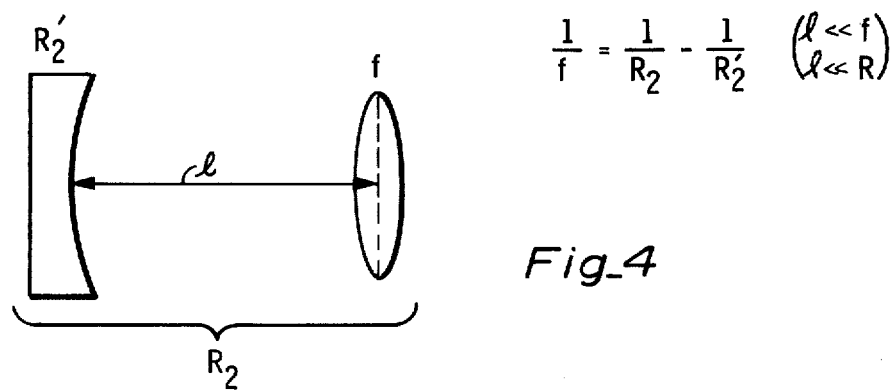
$$\frac{1}{f} = \frac{1}{R_2} - \frac{1}{R_2'} \quad \begin{pmatrix} \ell \ll f \\ \ell \ll R \end{pmatrix}$$
Fig_4

4,310,808

HIGH POWER LASER EMPLOYING AN UNSTABLE RESONATOR

This is a continuation of application Ser. No. 752,110, filed Dec. 20, 1976 and now abandoned.

BACKGROUND OF THE INVENTION

The present invention relates in general to high power pulsed lasers and more particularly to an improved high power laser employing a confocal unstable resonator of the type having no focal points within the resonator.

DESCRIPTION OF THE PRIOR ART

Heretofore, high power lasers have been built utilizing an unstable optical resonator and a high gain laser medium, i.e., a neodymium doped glass rod pumped by means of flash lamps. The optical resonator was designed to be confocal. Such a laser is disclosed in an article entitled "Telescopic-Resonator Laser" appearing in the Soviet Physics JETP, Vol. 31, No. 3 of September 1970, pages 420–424.

One of the problems with this prior art laser is that thermal instabilities were observed, i.e., the angular divergence of the output beam was seen to increase near the end of the pump pulse and the angular distribution of the power density in the annular output beam was seen to vary from pulse to pulse. It was believed that the angular divergence problem was associated in some way with thermal deformations of the resonator which were thought to increase with time during the pulse. The irregular displacements of the power density within the beam were unexplained. These problems are alluded to at Page 423 of the aforecited article.

It is also known from the prior art that high gain crystalline laser mediums, i.e., Nd:YAG, when pumped with flash lamps exhibit a focusing effect similar to a positive lens. This positive focusing effect has previously been taken into account in the design of stable optical resonators, i.e., resonators wherein an off-axis ray within the resonator traces a path which falls back on itself across the optical axis of the resonator. We have found that such stable resonators are generally unsuited for high power applications because the circulating power density within the resonator builds up to too high a value for a given output power causing the optical components within the resonator to fail or to degrade in use because of limited mode volume.

SUMMARY OF THE PRESENT INVENTION

The principal object of the present invention is the provision of an improved high power laser employing an unstable resonator for increasing the peak power output of the laser beam.

In one feature of the present invention, a high gain laser medium is located within an optical resonator defined by reflectors which are formed and arranged so that the optical resonator is free of any focal points therein and the optics are arranged so that an off-axis ray traces a reflective path within the resonator characterized by a substantial flow of optical power in a direction transverse to the optical path of the resonator (unstable resonator) and the focal lengths of the reflectors and the thermal focal length of the gain medium are arranged so that the output beam is collimated at the output of the optical resonator.

In another feature of the present invention the optical resonator, taking into account the thermal focusing positive lens effect of the high gain laser medium, is a confocal optical resonator.

In another feature of the present invention the high gain laser medium comprises a lightly doped Nd:YAG crystalline rod.

In another feature of the present invention the optical resonator includes a Q switch for pulsing the output power of the laser.

In another feature of the present invention one reflector of the optical resonator comprises a convex mirror disposed on the optical axis of the resonator and the second reflector is coaxially aligned with the first and is substantially larger in diameter so that the output beam is diffracted around the outer periphery of the first reflector with an output coupling factor substantially greater than 50% of the circulating power within the resonator.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram, partly in block diagram form, of a laser incorporating features of the present invention, FIG. 2 is a sectional view of the output beam of the laser of FIG. 1 taken along line 2—2 in the direction of the arrows, FIG. 3 is a transverse sectional view of the structure of FIG. 1 taken along line 3—3 in the direction of the arrows, and FIG. 4 is a schematic line diagram depicting the method for compensating for the positive lens effect of the laser rod operating at an average flash lamp input power.

DESCRIPTION OF THE PREFERRED EMBODIMENTS

Referring now to FIG. 1 there is shown a laser 11 incorporating features of the present invention. The laser includes an optical resonator 12 defined by the region between an output mirror 13 and another end mirror 14. The spacing L between the first and second mirrors 13 and 14 must be adjusted to take into account the optical characteristics of all of the optical elements disposed within the optical resonator 12.

A laser high gain medium 15, such as a neodymium doped yttrium-aluminum garnet (Nd:YAG) is disposed on the optical axis of the resonator 12 for providing optical gain for the laser. A flash lamp 16, such as a pair of xenon flash lamps, disposed within a pair of elliptical reflectors 17, serves to irradiate the laser gain medium with optical energy for pumping the laser gain medium 15 to a population inversion of the lasing transitions. A hollow cylindrical ultraviolet filter 18 is disposed coaxially surrounding the laser gain medium 15 in spaced relation therefrom to filter out the UV radiation and to provide an annular passageway 19 for flow of a fluid coolant therethrough for cooling of the laser gain medium in use. A Q switch 21 is disposed within the optical resonator 12 on the optical axis thereof. The Q switch serves as a fast acting switch for pulsing the laser on and off. In a preferred embodiment the Q switch 21 comprises a KD*P crystal 22 having a pair of ring electrodes 23 and 24 disposed on opposite ends thereof for applying an electrical potential thereacross so that when the potential, as of several kV, is applied across the KDP crystal 22, the crystal serves to rotate the polarization of the optical radiation by approximately one-quarter of a wavelength for each transit through the KD*P crystal. A linear polarizer 25 is associated with the KD*P crystal for polarizing the optical radiation in a first linear direction, such as in the vertical direction. The electrical potential is applied across the KD*P crystal from a pulser 26, such as a thyratron. A tilted etalon 27 is disposed on the optical axis of the resonator for providing a band pass filter at the desired operating optical wavelength of the resonator. The output mirror 13 is supported from a Brewster angle window 28 via a centrally disposed axially directed post 29 mounted to the center of the Brewster angle window 28.

The optical resonator 12 is designed as an unstable resonator, i.e., a ray slightly off the optical axis of the resonator 12 traces a reflective path back and forth between the mirrors 13 and 14 which begins near the axis of the resonator and moves to the outside of the resonator, thereby producing a power flow in the resonator which moves radially outward from the optical axis of the resonator. In this manner, the optical energy is coupled by diffraction out of the resonator 12 around the outer periphery of the output mirror 13.

In addition, the curvatures of the two mirrors and the focal properties of the various elements within the resonator, especially including the thermal focusing properties of the laser gain medium 15 are arranged so that the output beam at the plane of the output mirror 13 is collimated, i.e., the beam is neither diverging or converging in the region of the beam at the output mirror 13. This is accomplished in the preferred embodiment of the present invention, as illustrated in FIG. 1, by designing the optical resonator 12 taking into account the thermal focusing properties of the laser gain medium 15 so that the optical resonator is a confocal resonator, i.e., the focii of the two mirrors, including the positive focusing effect of the laser gain medium 15 occur at the same point outside of the optical resonator 12.

In case the output mirror 13 is convex, the focal point thereof, as used in the definition of confocal, refers to the imaginary focal point and corresponds essentially to the radius of curvature $R_2$ of the output mirror 13 divided by two. The minimum spot size of the optical resonator 12 occurs in the transverse plane of the output mirror 13.

As above mentioned, the laser gain medium 15, such as the Nd:YAG laser rod, has a thermal focusing effect and operates as a positive lens having a focal length f in meters versus average flash lamp input power P in kilowatts which is closely approximated by the equation:

$$f = (2.1)/P \quad \text{(Eq. 1)}$$

In addition the optical resonator 12 is designed so that no focal point is included within the resonator 12 (positive branch resonator). The reason for this is that at a focal point within the resonator, the intensity of the beam might well exceed the dielectric strength of the air or of the material in which the focal point occurred. This would result in deleteriously affecting the peak power capability of the laser and could result in destruction or degradation of one or more of the optical components within the optical resonator 12 of the laser.

Furthermore in a preferred embodiment, the optical resonator 12 is of the confocal type when taking into account the positive lens effect of the laser gain medium 15 due to the thermal gradient produced within the laser gain medium by the absorbed flash lamp power. The optical resonator 12 preferably has an output coupling coefficient or factor $\delta$ which is relatively high, i.e., greater than 50% and preferably in the range of 80 to 90%.

In a typical example of the laser 11, the laser gain medium 15 comprises a lightly doped Nd:YAG rod as of 6.3 millimeter diameter and doped to a doping of between 0.5% and 0.8% Nd by atomic weight. The rod 15 has a length greater than two inches and approximately two inches of its length is pumped by means of the high energy xenon flash lamps 16 having an average input power of approximately 800 watts. The ends of the laser rod 15 are inclined at an angle of approximately 1° out of perpendicular relative to the optical axis of the resonator 12 and are parallel to prevent setting up of undesired multiple reflection internally of the rod. The xenon flash lamps 16 have elliptical reflectors 17 coated with gold or silver. The linear polarizer 25 comprises a calcite crystal which is commercially available from Karl Lambercht, Inc. of New Jersey. The KD*P crystal 22 has a diameter greater than the diameter D of the laser rod 15 and preferably comprises a deuterated potassium dihydrogen phosphate crystal commercially available from Laser Metrics, Inc. of New Jersey. The back resonator reflector 14 can be a grating or a mirror which is planar, concave or convex with a radius of curvature $R_2$ determined by the conditions necessary for a confocal resonator taking into account the positive lens effect of the laser gain medium 15. In one preferred embodiment, the back resonator mirror 14 is concave having a high reflectivity coating formed by multilayer dielectric coating on a fused silica substrate to provide greater than 99% reflectivity at a wavelength of interest for the operating wavelength of the resonator 12. Suitable mirrors are commercially available from Coherent Radiation, Inc. of Palo Alto, Calif. The diameter of the back resonator mirror 14 is preferably much greater than the diameter D of the laser rod 15 and, in a typical example, is approximately 1.0 inch in diameter.

The line narrowing element, such as the tilted etalon 27 is designed for a narrow passband width between 0.1 and 0.5 wave numbers. In a preferred embodiment it has a band pass center wavelength at 1.064 micrometers. A suitable tilted etalon is commercially available from Coherent Radiation, Inc. of Palo Alto, Calif. The laser 11 preferably has a resonator magnification M falling within the range of 2 to 5 where the magnification M is defined as the ratio of the diameter D the laser rod 15 to the diameter d of the output mirror 13. In a preferred embodiment, the magnification M was 3.55.

The design of the unstable resonator 12 is complicated by interdependence of the resonator length L, output coupling coefficient $\delta$, laser rod diameter D, and mirror radii of curvature $R_1$ and $R_2$. Since the cavity length and the output coupling coefficient are conveniently varied, the Nd:YAG rod diameter D and mirror radii of curvature $R_1$ and $R_2$ are preferably fixed at standard values.

The mirror radii of curvature for the positive branch confocal optical resonator 12 are defined by:

$$R_1 = 2L/(M-1) \quad \text{(Eq. 2)}$$

and $$R_2 = 2ML/(M-1) \quad \text{(Eq. 3)}$$

where L is the empty resonator length, $R_1$ and $R_2$ are the output and back resonator mirror curvatures and M is the magnification. The geometrical output coupling coefficient is defined by:

$$\delta = 1 - \frac{1}{M^2} \quad \text{(Eq. 4)}$$

In practice, diffraction effects reduce the output coupling coefficient $\delta$ to that value slightly less than that which would be obtained if the optical resonator 12 were designed to operate at equivalent Fresnel numbers, as defined by:

$$N_{eq} = \left(\frac{M-1}{2M^2}\right) \frac{D^2}{4L\lambda} \quad \text{(Eq. 5)}$$

with values of 0.5, 1.5, 2.5 . . . .

In designing the optical resonator 12, it is preferred to eliminate M from Equation (5) using the relation $M = 1 + 2L/|R_1|$ and to solve for the cavity length given by:

$$L = \frac{-|R_1|}{2} + \frac{D}{4}\left[\frac{|R_1|}{\lambda N_{eq}}\right]^{\frac{1}{2}} \quad \text{(Eq. 6)}$$

where D is the laser rod diameter and $\lambda$ is the laser wavelength.

The geometrical value for $R_2$ is given by the above relation for a given value of M and L. As a final step, the correction for the focal length of the Nd:YAG rod is introduced. Given the available back mirror curvature $R_2'$ and calculating the laser gain medium rod focal length f required to achieve an effective mirror curvature equal to $R_2$, the following expression may be employed:

$$\frac{1}{f} = \frac{1}{R_2} - \frac{1}{R_2'} \quad \text{Eq. (7)}$$

Equation (7) applies if the mirror to rod distance l (see FIG. 4) is less than the rod focal length f. The available back mirror curvature $R_2'$ is chosen such that the laser rod focal length f corresponds to the desired average input lamp power, such as 800 watts.

As an example, with $R_1 = -50$ centimeters (convex) radius and $N_{eq} = 1.5$ we find that $L = 64$ centimeters and $R_2 = +178$ centimeters (concave) at $M = 3.53$. The geometrical output coupling coefficient $\delta$ is 92%, however the measured output coupling including diffraction effects is 84%. For the 6.3 millimeter rod diameter D, the magnification M dictates a 1.8 millimeter diameter d output mirror 13. Operating at an average input lamp power of 500 watts (50 Joules at 10 pulses per second) gives a rod focal length f near 437 centimeters which leads to a standard 300 centimeter (concave) back mirror curvature $R_2$. The output mirror 13 was ground to 1.80 millimeter diameter d and coated for high reflectivity at 1.06 micrometers and then cemented to a 1 millimeter diameter post 29 which was held in the Brewster angle window 28.

The output beam pattern is as shown in FIG. 2 and comprises a 6.3 millimeter diameter spot with a 1.8 millimeter diameter hole. In the near field the Fresnel diffraction rings from the rod 29 and output mirror 13 apertures were evident. In the far field, the beam converted to a modified Airy disc pattern with the fraction of energy in the central lobe equal to the fractional output coupling.

The flash lamp 16 is typically operated with a pulse length of approximately 200 microseconds to deliver between 20 and 70 Joules of energy to the laser rod 15 with a pulse repetition rate of approximately 10 Hertz. The laser is Q-switched on after each of the flash lamp pump pulses to dump the energy stored in the laser gain medium into the output laser beam. The aforementioned laser has operated at up to 250 mJ energy per output beam pulse with a pulse width of approximately 10 nanoseconds. This corresponds to a peak power outside the optical resonator 12 of 25 megawatts and to 75 megawatts per square centimeter. The circulating power density inside the resonator is approximately 100 megawatts per square centimeter. This is to be contrasted with a stable resonator design wherein the output beam pulses have an energy of 10 mJ with a peak power of one megawatt and corresponding to 100 megawatts per square centimeter within the optical resonator. It is seen that the output power is substantially increased at the same circulating power density utilizing an unstable resonator design as contrasted with a stable resonator design.

What is claimed is:

1. In a high power laser:
   a positive branch unstable optical resonant cavity;
   a lasing gain medium positioned with said cavity and having a longitudinal axis for amplifying the intensity of a beam of coherent optical radiation passing therethrough along said longitudinal axis;
   means for pumping said lasing gain medium with sufficient energy to create a thermal gradient within said medium transverse to said axis which alters the medium's dielectric constant to form an optical lens having a characteristic focal length f; and
   said resonant cavity including first and second reflective means separated by such a distance and having respective focal lengths of such dimension, in conjunction with said optical lens, so as to cause optical energy within said cavity to be reflected back and forth between said reflective means and through said lasing gain medium over an optical path which is free of any focal points along said path in the region between said reflective means and so as to produce a substantial flow of optical power within said resonant cavity in a direction transverse to said optical path and said longitudinal axis.

2. The laser of claim 1 wherein said optical resonant cavity, including the optical lens formed by the dielectric constant of the medium, is formed and arranged as a confocal optical resonator at a resonant optical wavelength of the cavity.

3. The laser of claim 1 wherein the focal length f of the laser gain medium is determined by the equation $f = 2.1/p$ where p is the average lamp input power in kilowatts and the focal length f is in meters.

4. The laser of claim 3 wherein the laser medium is a yttrium aluminum garnet crystal doped with neodymium to less than one atomic weight percent.

5. The laser of claim 4 wherein the neodymium doping is in the range of 0.5 to 0.8 percent by atomic weight.

6. The laser of claim 1 wherein said first reflector means is a convex mirror disposed facing and coaxial with said second reflector means which comprises a concave mirror and including an output port disposed surrounding the periphery of said first reflector means.

7. The laser of claim 1 including an output means formed and arranged for coupling out more than 50% of the energy being reflected back and forth at a resonant optical wavelength of said cavity.

8. The laser of claim 1 including switch means within said resonant cavity and in the optical path of said optical resonant cavity for switching said optical resonant cavity between a resonant and a nonresonant state for optical electromagnetic wave energy of an optical wavelength of the cavity for switching the beam on and off.

9. The laser of claim 8 wherein said switch means includes linear polarizer means for linearly polarizing optical wave energy passing therethrough and quarter wave plate means for rotating the polarization of the optical wave energy by approximately 90° per pass therethrough in response to an input.

10. The laser of claim 1 wherein said first and second reflector means are arranged for a flow of power radially outwardly from the beam axis of the optical resonant cavity.

11. The laser of claim 1 wherein said optical resonant cavity is formed and arranged for producing said beam as a beam of annular transverse cross-section, there being a generally uniform power density within the beam around the annulus of the beam.

12. The laser of claim 1 wherein said lasing gain medium is a solid.

13. The laser of claim 1 wherein said resonant cavity includes an etalon between the first and second reflective means, said etalon including a filter for selecting the wavelength of the beam.

* * * * *